United States Patent [19]

Jensen

[11] 4,083,711
[45] Apr. 11, 1978

[54] GLASS FOREHEARTH HAVING A VISCOSITY PUMP

[75] Inventor: Thomas H. Jensen, Murrysville, Pa.

[73] Assignee: PPG Industries, Inc., Pittsburgh, Pa.

[21] Appl. No.: 782,134

[22] Filed: Mar. 28, 1977

[51] Int. Cl.² ............................................. C03B 5/26
[52] U.S. Cl. ...................................... 65/346; 65/333; 65/347; 65/356
[58] Field of Search .............. 65/346, 347, 11 W, 356, 65/333

[56] References Cited

U.S. PATENT DOCUMENTS

| 3,446,149 | 5/1969 | Amos et al. | 103/95 |
|---|---|---|---|
| 3,498,778 | 3/1970 | Hynd | 65/356 |
| 3,573,014 | 3/1971 | Strickland et al. | 65/11 W |
| 3,574,581 | 4/1971 | Strickland et al. | 65/1 |
| 3,697,241 | 10/1972 | Strickland et al. | 65/2 |
| 3,733,188 | 5/1973 | Jensen | 65/11 W |
| 3,969,098 | 7/1976 | Jensen | 65/1 |
| 4,017,287 | 4/1977 | Jensen | 65/2 |

*Primary Examiner*—Arthur D. Kellogg
*Attorney, Agent, or Firm*—Alan T. McDonald; John E. Curley

[57] ABSTRACT

A delivery system is disclosed for pumping and pressurizing viscous fluid materials, such as molten glass. The pump comprises a rotating rotor which is located in a channel of the viscous fluid, such as in the forehearth of a glass melting furnace. In a glassmaking operation, the rotor uses the viscous drag of the molten glass against it to pump the molten glass from an open channel into a closed and pressurized channel where the pressurized molten glass may be, for example, extruded into glass filaments. The pumping system described also finds utility in pumping other viscous materials such as resins in fluid form.

8 Claims, 4 Drawing Figures

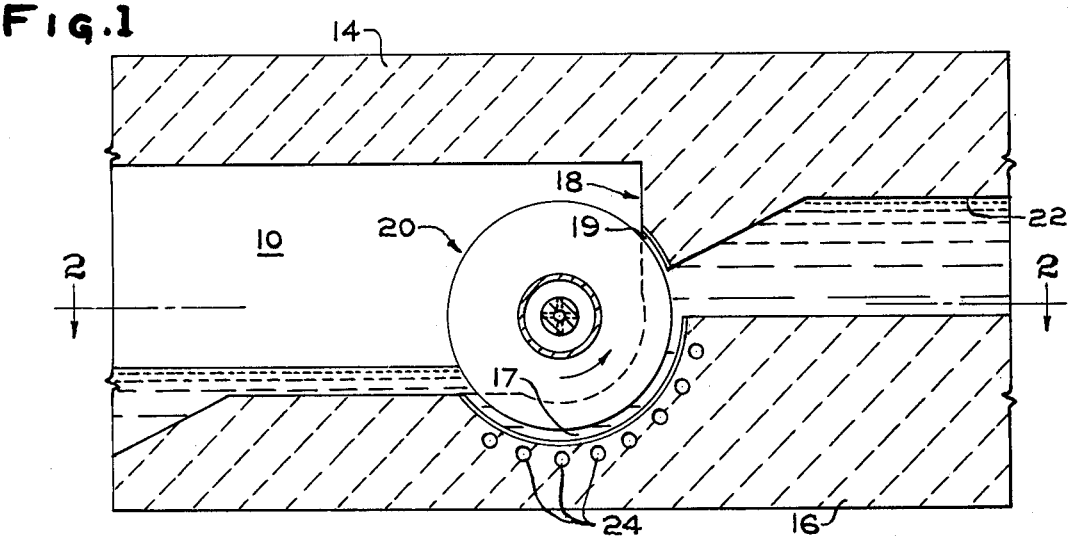
Fig.1
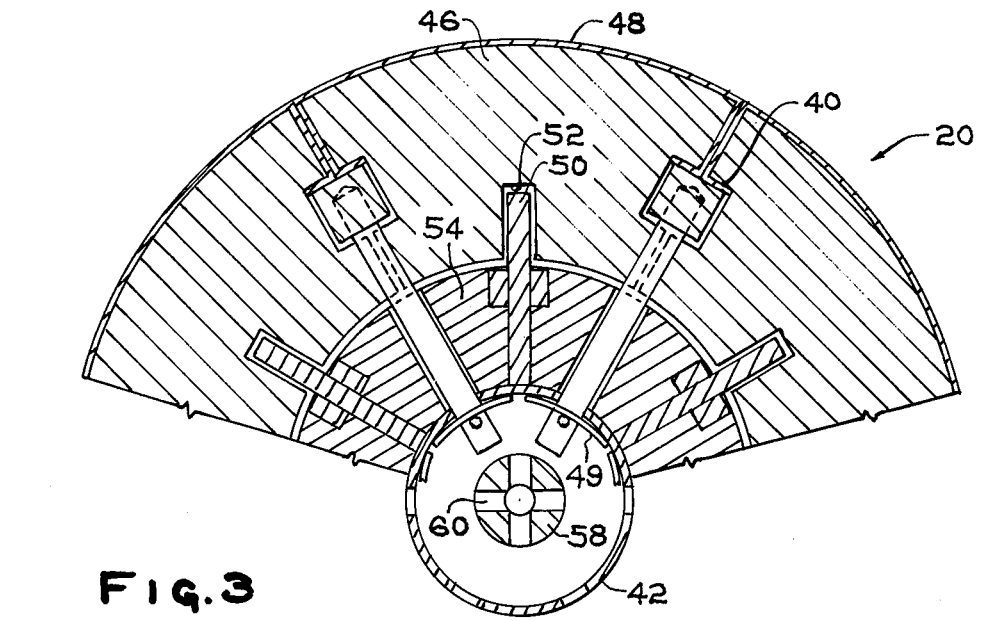
Fig.2
Fig.3

GLASS FOREHEARTH HAVING A VISCOSITY PUMP

BACKGROUND OF THE INVENTION

Glass strands are typically formed by attenuating glass filaments through bushing tips at the bottom of a heated bushing containing molten glass. The filaments pass across the face of an application surface where they are coated with a binder and/or size. The filaments are then gathered into a unified strand by means of a gathering shoe which may be, for example, a grooved bar or disc formed of a material such as graphite, traversed across the face of a rotating spiral and wound as a forming package around the mandrel or collet of a winder. The pulling forces from the collet provide the attenuative forces necessary to form glass filaments.

Often, the bushings are directly connected to a forehearth of a glass melting furnace, with the molten glass from the furnace then being directly attenuated into filaments. Such an operation does not require any pressurization of the molten glass beyond the natural head above the bushing of the glass, as the filaments are being formed from bushing tips at the bottom of the bushing of a size to allow the necessary flow rate of glass through the tips.

In a different type of glass strand formation, glass filaments are formed from much smaller orifices at much higher pressures. The pressure may be produced by maintaining a large column or head of glass above the bushing or by pumping the glass through the bushing. Typical of such glass fiber forming operations is the system disclosed in U.S. Pat. No. 3,573,014, which is assigned to the assignee of the present invention and incorporated herein by reference.

A typical pump for molten glass is a viscosity pump, such as that illustrated in U.S. Pat. No. 3,446,149, which is also assigned to the assignee of the present invention and incorporated herein by reference. This patent employs a rotating cylindrical element having a uniform inner surface and a stator within the cylindrical element having a plurality of channels in its surface with viscous fluid such as molten glass being pressurized by flowing between the two elements due to the viscosity drag of the molten glass. The pump requires that the cylindrical element, the stator, and any other part which contacts the molten glass be formed of a material such as platinum or a platinum-rhodium alloy to protect the elements from the corrosive nature of the molten glass. It is desirable, therefore, to produce a viscosity type pump which will reduce the amount of precious metal necessary in its construction and which employs relatively smooth surfaces between which the viscous fluid flows to reduce wear of the surfaces.

The use of pressurized glass in fiber forming has several advantages over attenuation from low pressure bushings. In a pressurized bushing the tips or orifices through which the filaments are attenuated are smaller in diameter for a given glass flow rate through the tips or orifices than with the low pressure bushings commonly employed. This smaller tip or orifice size results in a lower fiber tension during forming. In addition, the tips or orifices may be more closely spaced than previously possible. Further, more orifices may be located on a single bushing than were previously employed. All of these advantages lead to greater production capability with far smaller bushings.

The size of the bushing is highly important. Due to the corrosive nature of molten glass bushings must be formed of precious metals, such as platinum or platinum-rhodium alloys, which will withstand this environment. These materials are extremely expensive. Thus, the smaller the bushing area necessary for a given production level, the smaller the capital investment, and the greater the return on investment becomes. Therefore, employment of pressurized bushings may substantially increase the productivity and profitability of glass fiber formation.

THE PRESENT INVENTION

By means of the present invention, a delivery system for viscous fluids, and molten glass in particular, having these desired characteristics is produced. The invention will be described with reference to the manufacture of glass fibers since this is an environment in which the major use of the invention is contemplated at this time. The pump of the present invention comprises a rotor which has a substantially uniform surface and which is located within the forehearth of a glass melting furnace. The forehearth is divided into two sections. The first section, which precedes the rotor, is an open channel through which the molten glass flows from the melting furnace to the rotor. The second section, which is located on the other side of the rotor, is a closed and pressurized channel from which the pressurized glass flows to the bushing orifices to be extruded into filaments.

The rotor transports the molten glass from the open channel to the pressurized channel using the viscous drag of the molten glass. The pump is thus designed to handle the complete output of the glass melting furnace to which it is connected and thus to supply all of the bushings associated with this furnace with a pressurized glass supply.

By employing a large diameter rotor design, a sufficient temperature gradient can be established between the "hot" working surface contacting the molten glass and the shaft about which the rotor revolves to permit conventional materials to be used in the main body of the rotor with only a platinum or platinum-rhodium alloy clad surface for protection from the molten glass. This is in contrast to the "submersible" type pump of the prior art which must inherently operate at molten glass temperature throughout and therefore precludes use of low temperature materials; i.e., precious metal must be used throughout the construction of the prior art submersible pump. Thus, the pump of the present invention substantially reduces the amount of precious metal employed and thus results in a substantial cost savings.

Also, the close working tolerances of a submersible pump require a universal drive system which introduces many problems. The rotor design of the present invention permits large clearances because of its increased size and therefore the universal can be eliminated.

BRIEF DESCRIPTION OF THE DRAWINGS

The pump of the present invention will be more fully described with reference to the figures in which:

FIG. 1 represents a sectional view of the pump of the present invention taken through 1—1 of FIG. 2;

FIG. 2 represents a sectional view of the pump of the present invention taken through line 2—2 of FIG. 1;

FIG. 3 represents a partial sectional view of the rotor employed in the pump of the present invention.

DETAILED DESCRIPTION OF THE DRAWINGS

Figure 4:
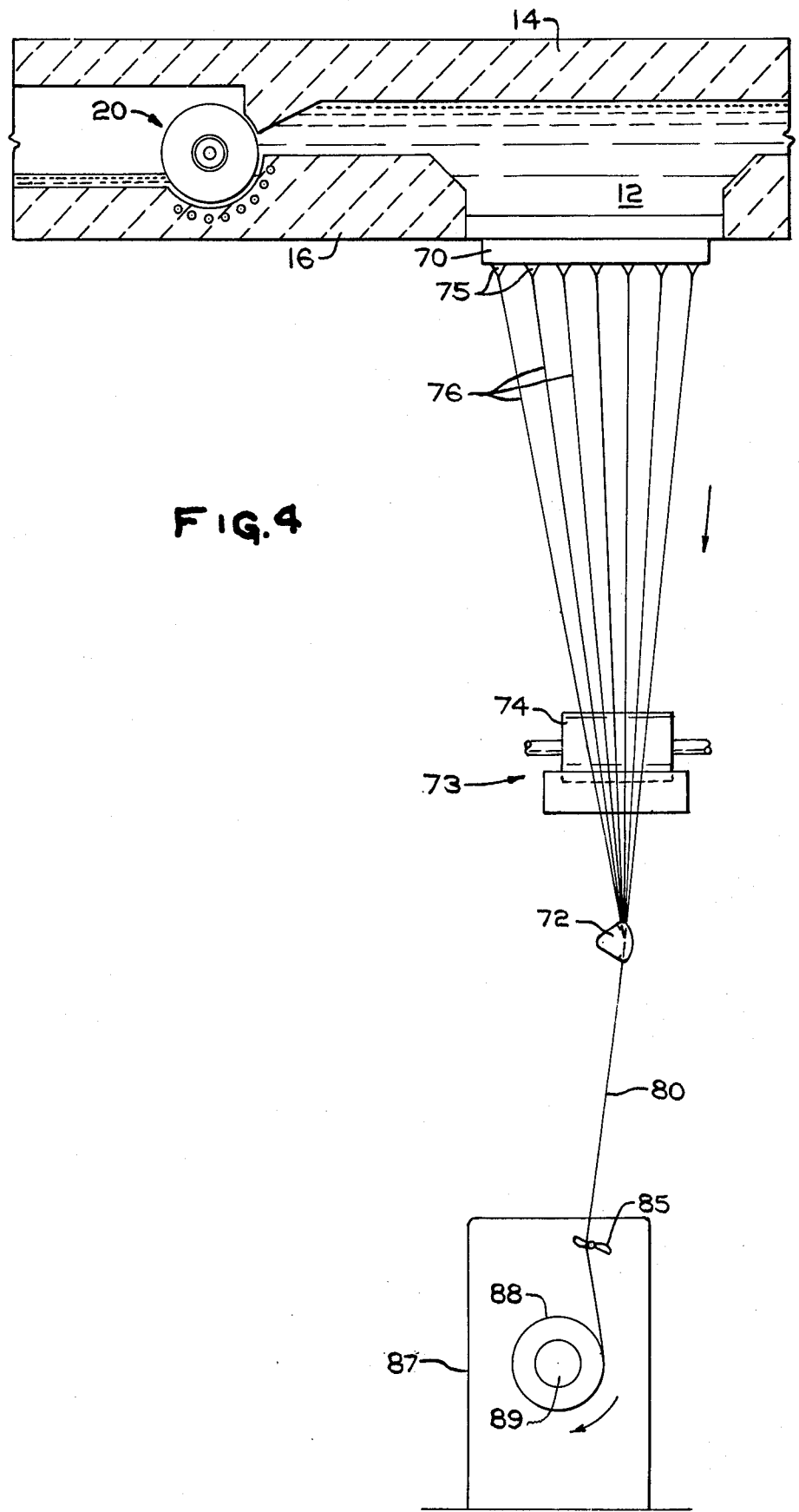
FIG. 4 illustrates a diagrammatic representation of a glass fiber forming position and its relation to the delivery system of the present invention.

Turning to FIGS. 1 and 2, the pump of the present invention generally comprises two elements, a forehearth having a top 14 and bottom 16 which is connected to a glass melting furnace, not shown, and a rotor 20 communicating with the top 14 and bottom 16 of the forehearth.

At the end of the forehearth pump section connected to the glass melting furnace is a large open channel 10. Inside of this channel 10 is the flowing, unpressurized molten glass 12. As illustrated the rotor 20 rotates counter-clockwise, pumping the molten glass from the open section 10 of the forehearth to a closed section 22, and due to the viscosity drag of the molten glass, draws the glass 12 from the open channel 10, through slot 17 which separates the outer surface of the rotor 20 and a correspondent curved portion of the forehearth bottom 16 and into the closed and pressurized section 22. Under the rotor 20 and within the bottom of the forehearth, or stator, 16 are preferably located a plurality of heating elements 24 which help maintain the temperature of the glass within desired limits and thus maintain the viscosity of the molten glass at a desired value. A section 18 of the top 14 of the forehearth extends downwardly to partially seal off the closed section 22 of the forehearth, leaving an opening 19 between the top 14 of the forehearth and the rotor 20. This section 18 produces a dam effect against the surface glass moving with the rotor resulting in a pressure rise in section 22 and prevents most of the molten glass 12 from flowing back from the pressurized section 22 to the open section 10 of the forehearth through the opening 19.

The pump theoretically operates according to the equation:

$$Q = \left\{ \left[ \frac{\pi \times D_r \times \text{RPM}}{2} \right] \times (D_1 - D_2) - \frac{P}{12 \times \mu} \left[ \frac{D_1^3}{L_1} + \frac{D_2^3}{L_2} \right] \right\} L_r$$

where
Q is the output of the pump;
$D_r$ is the diameter of the rotor;
RPM is the speed of the rotor in revolutions per minute;
$D_1$ is the clearance distance 17 between the rotor and the bottom section 16 of the forehearth;
$D_2$ is the clearance distance 17 between the rotor 20 and the extension 18 of the top 14 of the forehearth;
$L_1$ is the length within which the rotor 20 is in communication with the bottom 16 of the forehearth at the distance $D_1$;
$L_2$ is the length within which the rotor 20 communicates with the extension 18 of the top 14 of the forehearth at the distance $D_2$;
P is the desired pressure;
$L_r$ is the length of the rotor; and
$\mu$ is the viscosity of the molten glass.

From this equation and from FIG. 1, it can be seen that $D_2$, the distance 19 and the length over which the rotor 20 must communicate with the extension 18 of the top of the forehearth 14, should be kept to a minimum, as this is the location where the molten glass 12 can leak back from the pressurized section 22 to the open section 10 of the forehearth. Ideally, these losses would be zero, however, this is not feasible, since the rotor 20 must have some clearance in which to rotate.

For example, to transport molten glass having viscosities in the range of about 200 to about 1000 poise, as is typical in glass fiber melting tanks, $D_1$ may range from about 0.020 inch (0.0508 centimeter) to about 0.250 inch (0.635 centimeter) and $D_2$ may range from about 0.003 inch (0.00762 centimeter) to about 0.100 inch (0.254 centimeter).

Preferably, the forehearth is platinum or platinum-rhodium alloy lined at and over the openings 17 and 19. However, this is not required. Other portions of the forehearth may also be clad, if desired.

Turning now to FIG. 2, it can be seen that not only is the closed and pressurized section 22 of the forehearth shortened in height from the opened section 10 but it is preferably also narrowed in width.

This figure also illustrates the cooling system for the rotor 20. A liquid or preferably a gaseous fluid, such as air, enters the rotor 20 through the central shaft 58 and is distributed from the central shaft 58 through openings 60 therein to the interior of the rotor 20. This shaft 58 rotates within bearings and is driven by a means, not shown, such as an electric motor. Cooling is necessary, since the outside of the rotor 20 will reach the temperature of the molten glass which are maintained, for example, over 1400° C., and it is necessary to keep the central shaft 58 on which the rotor 20 rotates at a substantially lower temperature.

The construction of the rotor 20 can best be seen in FIG. 3. The rotor 20 comprises a plurality of sections or wings 46 which are held together by tension members 40 which are in turn connected to a common shaft 42 by springs 49 to maintain these members 40 in place. These tension members 40 are formed of material such as high strength steel. The tension members 40 are positioned within openings of adjoining wings 46. The wings 46 are formed of material such as low conductivity ceramic and are clad on the outside with a layer of material such as platinum or a platinum-rhodium alloy 48. This cladding is employed to prevent wear due to the corrosive effects of the molten glass. Welded to the shaft 42 are torque members 50. As the shaft 42 is rotated, the torque members 50 drive the wings 46. The torque members 50 are located within slots 52 of the wings 46 and are embedded in high strength castable ceramic 54 as well as being welded to the shaft 42. A central shaft 58 is provided as previously described which has a plurality of openings 60 therein. These openings are connected to a source of air or other cooling fluid to cool the central portion of the rotor 20.

FIG. 4 illustrates the location of the glass delivery system with respect to the glass fiber forming operation. As can be seen in this figure, the top section 14 and the bottom section 16 of the forehearth extend beyond the rotor 20 and form an enclosed chamber for the pressurized molten glass. Connected to the bottom section 16 of the forehearth is a glass fiber forming bushing 70, which may include bushing tips 75. Optionally, tubular bushings having no bushing tips could be employed. The bushing 70 is only one of a plurality of bushings along the length of the forehearth. The pressurized molten glass 12 is extruded through the orifices or tips 75 into filaments 76. The filaments pass across the application surface 74 of an applicator 73 and are coated with a binder and/or size. The filaments 76 are then gathered into one or more strands 80 by a gathering shoe 72, traversed by spiral 85 and collected as a forming package 88 or a collet 89 carried by a winder 87.

To illustrate the action of the pump, using the equation previously described and designing the pump wherein:

$Q$ = 1,655 pounds per hour (750.7 kilograms per hour);
$D_r$ = 12 inches (30.48 centimeters);
$D_1$ = 0.250 inch (0.635 centimeters);
$D_2$ = 0.10 inch (0.254 centimeter);
$\mu$ = 300 poise (300 grams per centimeter second);
$L_1$ = 12 inches (30.48 centimeters);
$L_2$ = 2 inches (5.08 centimeters);
$L_r$ = 12 inches (30.48 centimeters); and
$P$ = 5 pounds per square inch (33783.8 pascals), the rotor 20 would theoretically need to be operated at a rate of 20 revolutions per minute. For an output Q of 3,470 pounds per hour (1574.0 kilograms per hour) and for a pump of the same dimensions, the rotor 20 would need to be operated at 30 revolutions per minute. Thus, the pump of the present invention will pressurize molten glass to the level necessary for extrusion at a relatively low speed. Such a low operating speed will increase the reliability of the pump and help reduce wear.

From the foregoing, it is obvious that the pump of the present invention provides a reliable and relatively low cost delivery system for pumping material such as molten glass.

While the invention has been described with reference to certain specific embodiments, it is not intended to be limited thereby, except insofar as appears in the accompanying claims.

I claim:

1. A delivery system for molten glass comprising a forehearth having an open section and a closed section, said open section containing unpressurized molten glass therein and said closed section containing pressurized molten glass, means for sealing said closed section to pressurize it and pump means including a rotor having a substantially uniform surface, said rotor being mounted within but adjacent to a wall portion of the forehearth at a position between said open and closed sections, said wall portion being shaped to a curve correspondent to but spaced from the outer surface of the rotor such that said portion of said forehearth acts as a stator with said rotor to transport molten glass from the open section to the closed section using the viscous drag of the molten glass against the forehearth and the rotor as the rotor is rotated within the molten glass in the forehearth.

2. The system of claim 1 including heating elements embedded within the bottom of the forehearth.

3. The system of claim 1 wherein the rotor comprises a shaft, a plurality of wings surrounding the shaft, a plurality of tension members connected to the shaft and the wings and a plurality of torque members connected to the shaft and embedded in castable ceramic surrounding the shaft to drive the wings.

4. The system of claim 3 wherein the wings are formed of low conductivity ceramic.

5. The system of claim 4 wherein the wings are clad with a platinum or platinum-rhodium alloy.

6. The system of claim 3 wherein the tension members are connected to the shaft by springs.

7. The system of claim 3 including means for introducing a cooling fluid through a central shaft of the rotor to cool the rotor.

8. The system of claim 1 wherein the forehearth and rotor are sized to accommodate complete output of a glass melting furnace connected thereto.

* * * * *